United States Patent [19]

Kubo et al.

[11] Patent Number: 5,046,068
[45] Date of Patent: Sep. 3, 1991

[54] MULTI-PROCESSOR SYSTEM TESTING METHOD

[75] Inventors: Masaya Kubo; Kaoru Suzuki, both of Hadano, Japan

[73] Assignee: Hitachi, Ltd., Tokyo, Japan

[21] Appl. No.: 340,081

[22] Filed: Apr. 18, 1989

[30] Foreign Application Priority Data

Apr. 21, 1988 [JP] Japan ................................ 63-96924

[51] Int. Cl.⁵ .............................................. G06F 11/00
[52] U.S. Cl. .................................... 371/16.1; 371/47.1
[58] Field of Search ............................. 371/16.1, 47.1

[56] References Cited

U.S. PATENT DOCUMENTS

| | | | |
|---|---|---|---|
| 3,896,418 | 7/1975 | Brown | 340/172.5 |
| 4,247,938 | 1/1981 | Kurihara et al. | 371/64 |
| 4,325,120 | 4/1982 | Colley et al. | 364/200 |

Primary Examiner—Jerry Smith
Assistant Examiner—Phung My Chung
Attorney, Agent, or Firm—Antonelli, Terry, Stout & Kraus

[57] ABSTRACT

In testing the fault handling function of a multi-processor system including a master processor, a slave processor, a storage control unit shared by these processors, and a service processor, the master processor and the slave processor cooperate to synchronize with each other issuing to the storage control unit successive storage access requests all designating the same storage area. The master processor also requests the service processor to generate a pseudo-fault in the above-mentioned storage area while these access requests are being successively issued in synchronism. Upon detecting a fault, the master processor collects and examines fault information, and outputs it when an abnormal result is detected.

7 Claims, 5 Drawing Sheets

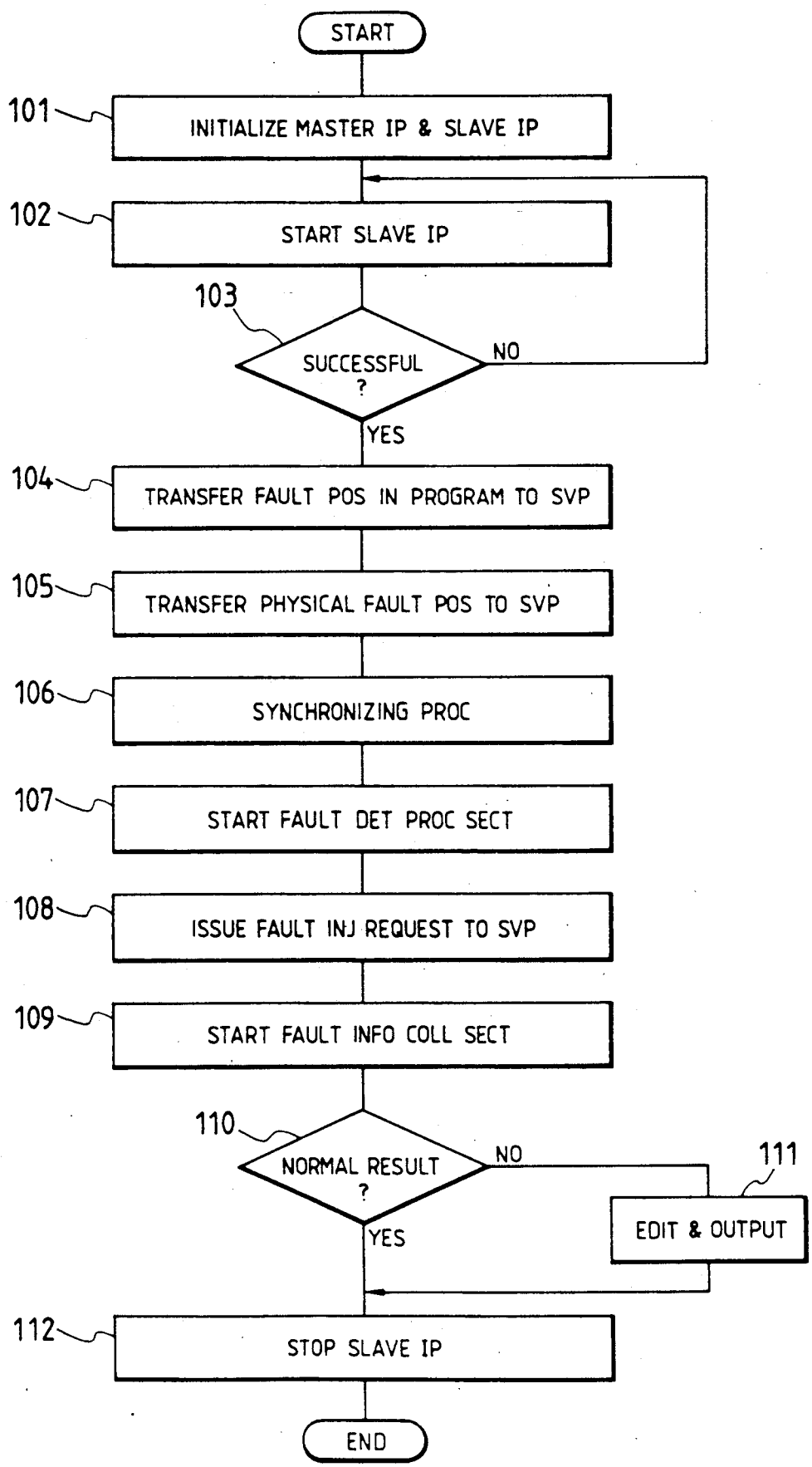

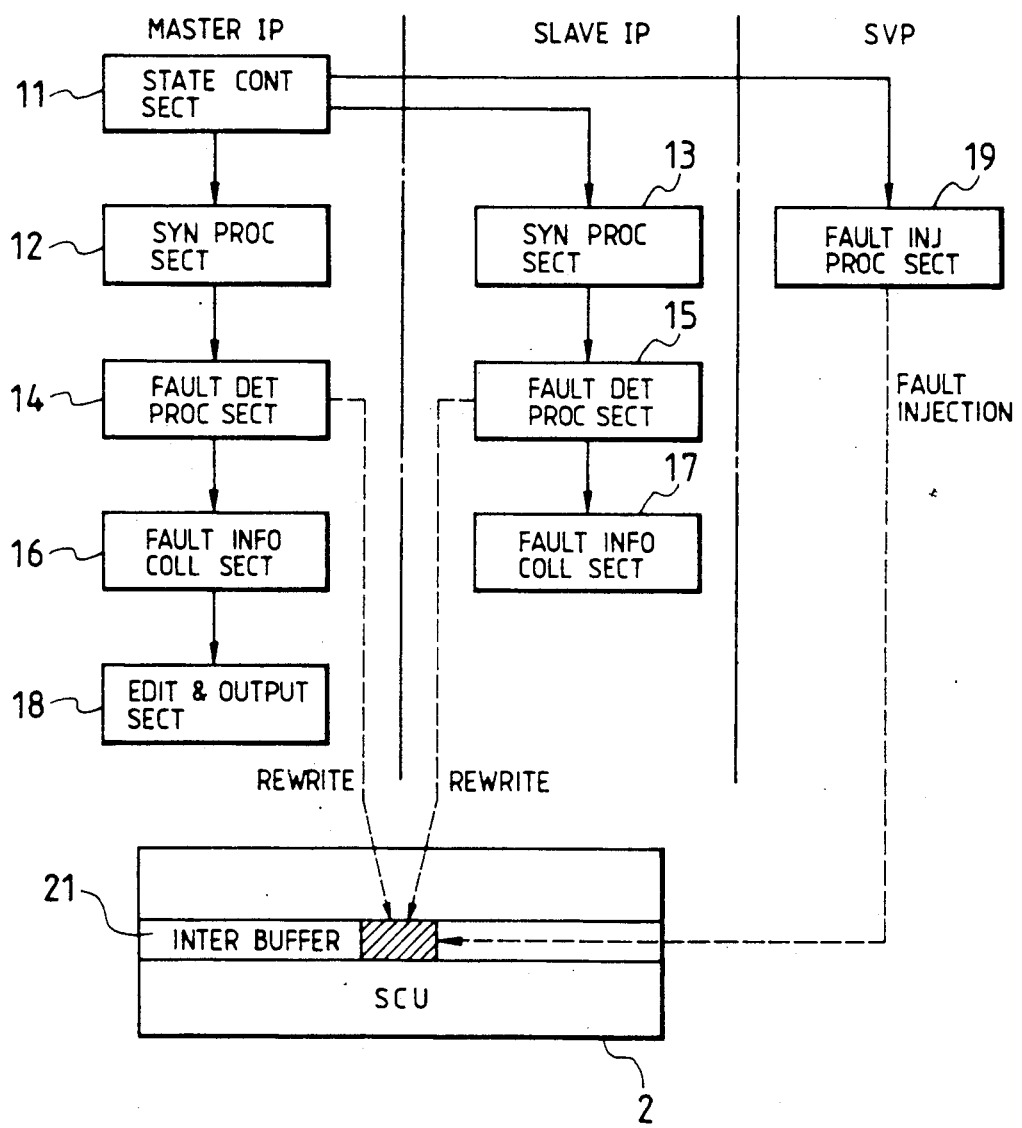

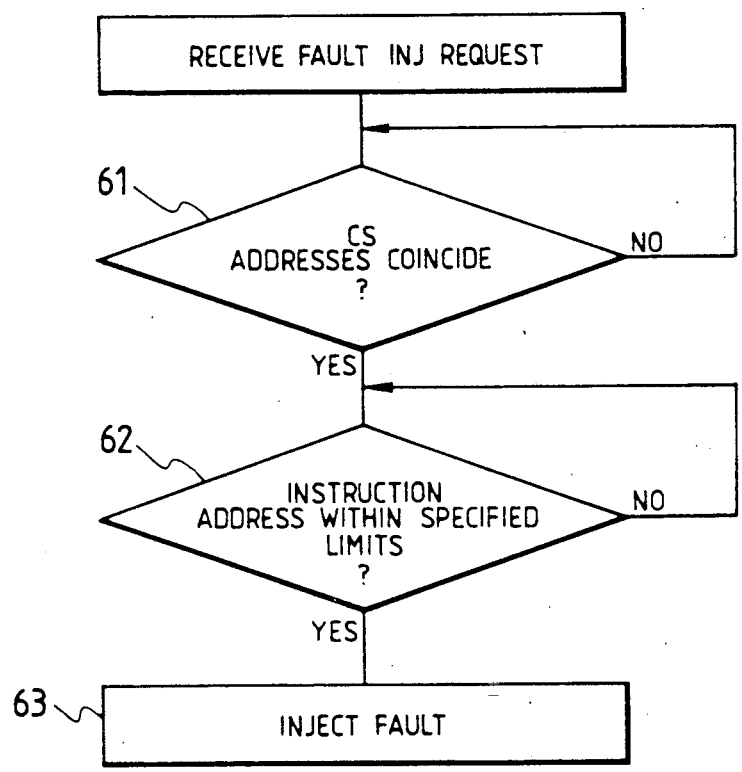

MULTI-PROCESSOR SYSTEM TESTING METHOD

BACKGROUND OF THE INVENTION

The present invention relates to tests of a data processing system having a multi-processor structure and, more particularly, to tests of a fault handling function in the circumstances where operation requests to a unit shared by a plurality of processors are thronging.

The data processing system is equipped with hardware and software for a variety of fault handling functions (to report the occurrence of a fault, collect fault information, retry, disconnect a faulty section, and so on) so as to enhance its reliability. In testing the data processing system, those fault handling function also have to be tested by generating pseudo-faults.

A primitive pseudo-fault generating method is to clamp the potential of a signal pin on a back panel manually at a certain value. According to this method, however, the manual operation is not only troublesome but also liable to cause errors such as selecting a wrong pin. In addition, it is difficult to precisely control the position in a program in which the pseudo-fault is generated. In a system disclosed as one improvement in Japanese Patent Laid-Open No. 60-193052, a special instruction inserted in a suitable position in a program for testing operations sets a designated value in a counter, and this value is subsequently counted up upon execution of each instruction. When this counter eventually overflows, a pseudo-fault is generated. According to this method, the pseudo-fault can be automatically generated in a desired position in the program. However, those methods of the prior art are lacking in special means for testing the multi-processor system.

The multi-processor system generally includes a variety of units that are shared by a plurality of instruction processors. For example, a storage control unit receives main storage access requests from the plural instruction processors and sequentially executes them. The faults of these shared units involve special problems. For example, when a fault occurs while the operation requests from the plural instruction processors are thronging, not only the operation requests being serviced at that time are affected but also the queue of the succeeding operation requests may be broken.

In order to sufficiently test the fault handling function for such a shared unit, therefore, it is necessary to intentionally create a situation in which the operation requests to the shared unit are thronging, and to generate a pseudo-fault within the shared unit just in that situation. However, such a testing method has not yet been established.

SUMMARY OF THE INVENTION

An object of the present invention is to make the tests of the fault handling functions of a multi-processor system more effective by creating a situation in which the operation requests to a unit shared by a plurality of instruction processors are thronging, and by generating a pseudo-fault within the shared unit just in that situation.

According to the present invention, a plurality of processors are controlled to synchronize with each other in issuing respective operation requests to a shared unit, and a pseudo-fault is generated within the shared unit during the issues of the operation requests thus synchronized.

The synchronization of the issues of the operation requests can be accomplished by synchronously starting the individual processors to execute the respective sequences of instructions requiring the operations of the shared unit. In that case, the pseudo-fault may be generated when a certain processor executes one arbitrary instruction in a predetermined section of its instruction sequence.

The situation in which the operation requests to the shared unit are thronging is created by synchronizing the issues of the operation requests from the plural processors to the shared unit, and the fault handling function can be tested under the required conditions by generating the pseudo-fault within the shared unit in that situation.

It eases the criticalness of the timing requirement for the synchronization that each processor is to execute its instruction sequence requiring the operations of the shared unit and that the pseudo-fault is to be generated upon execution of one arbitrary instruction in a predetermined section of one of the instruction sequences.

Thus, according to the present invention, the response of a fault handling mechanism to a fault can be fully tested by examining its response to a pseudo-fault which is generated in the situation in which the operation requests to a unit shared by a plurality of instruction processors are thronging. As a result, the tests of the multi-processor system are made more effective to enhance the reliability of the system. In addition, since the present invention can be mostly implemented by software, both the spot in which the pseudo-fault is generated and kind of the operation being performed at the time can be freely selected. Moreover, the present invention can be easily applied no matter what the architecture of the processor and the system structure might be.

Other objects, features and advantages of the present invention will become apparent from the following description taken with reference to the accompanying drawings.

BRIEF DESCRIPTION OF THE DRAWINGS

FIG. 2 is a functional block diagram showing a mechanism for executing one embodiment of the present invention;

FIG. 3 is a flow chart showing the processing to be accomplished by a state control section shown in FIG. 2;

FIG. 6 is a flow chart showing the procedure for generating a pseudo-fault by a fault injecting process section shown in FIG. 2.

DETAILED DESCRIPTION OF THE PREFERRED EMBODIMENT

Figure 1:
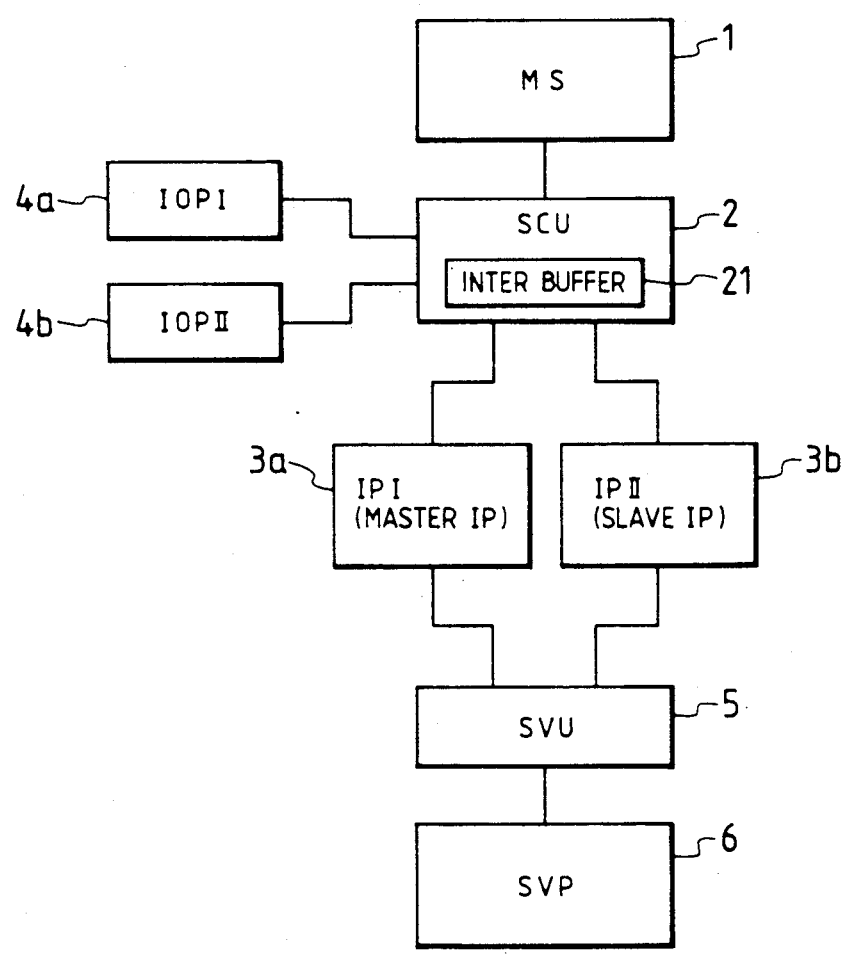
FIG. 1 is a block diagram showing one example of a multi-processor system to which the present invention can be applied.

FIG. 1 shows one example of the multi-processor system to which the present invention can be applied. In this system, a main storage (MS) 1 is connected via a storage control unit (SCU) 2 with two instruction processors (IPI and IPII) 3a and 3b and two input/output processors (IOPI and IOPII) 4a and 4b. In other words, those instruction processors 3a and 3b share the storage control unit 2. This storage control unit 2 has an intermediate buffer storage 21 for storing a copy of a portion of the content of the main storage 1. The storage control unit 2 executes each main storage access request from the processors on the intermediate buffer storage 21 if the data at the address designated by this request resides in the buffer 21, or else it accesses the main storage 1. The instruction processor 3a is used as a master instruction processor (which will be shortly referred to as "master IP"), and the instruction processor 3b is used as a slave instruction processor (which will be shortly referred to as "slave IP").

These instruction processors 3a and 3b are connected via a service unit (SVU) 5 with a service processor (SVP) 6. The service unit 5 not only functions as an interface between the instruction processors 3a and 3b and the service processor 6 but also intermediates the communications between the instruction processors for the tests. Since the successive main storage access requests from the two instruction processors 3a and 3b may often crowd (converge) to the storage control unit 2, the fault handling functions should desirably be tested in such a situation.

FIG. 2 is a functional block diagram showing one example of a mechanism for testing the system of FIG. 1 in accordance with the present invention. The master IP 3a is equipped with a state control section 11. This state control section 11 controls the execution of the tests. Specifically, the state control section 11 initializes the operation circumstances of the instruction processors 3a and 3b, starts the slave IP 3b, and sends the service processor 6 designations of the timing and position for generating a pseudo-fault, followed by a pseudo-fault generation request.

The master IP 3a and slave IP 3b are equipped with synchronizing process sections 12 and 13, fault detecting process sections 14 and 15 and fault information collection sections 16 and 17, respectively. The master IP 3a is further equipped with an edit/output section 18. The synchronizing process sections 12 and 13 cooperate with each other to synchronize the starts of the respective fault detecting process sections 14 and 15 of the master IP 3a and slave IP 3b, as will be described hereinafter. The fault detecting process sections 14 and 15 execute respective test instruction sequences, as will be described hereinafter, to detect a fault which will occur in the meantime. In the present embodiment, these two test instruction sequences repeatedly rewrite the content of the same area of the intermediate buffer storage unit 21. The fault information collection sections 16 and 17 collect and store the information concerning the faults reported to the master IP 3a and slave IP 3b, respectively. The edit/output section 18 compares the fault information collected by the fault information collection section 16 of the master IP with an expected value, and edits and outputs the former in case of discord. Those functional sections 11 to 18 are implemented by software in the present embodiment, but at least some of them may alternatively be implemented by hardware.

The service processor 6 is equipped with a fault injecting process section 19 which receives information designating the timing for generating a pseudo-fault (i.e., a position in the test instruction sequence) and the physical position for generating the same (i.e., a specified area of the intermediate buffer storage in the example shown in FIG. 1) and generates a pseudo-fault at the designated timing and in the designated position while the test instruction sequence is being executed. That fault injecting process unit 19 may preferably be implemented either by hardware or by a combination of hardware and microprograms because high-speed operations are required. In a modified embodiment, the overall control of the test may be performed by the slave IP. In that case, the functional sections 11, 12, 14, 16 and 18 belong to the slave IP, and the functional sections 13, 15 and 17 belong to the master IP.

Figure 4:
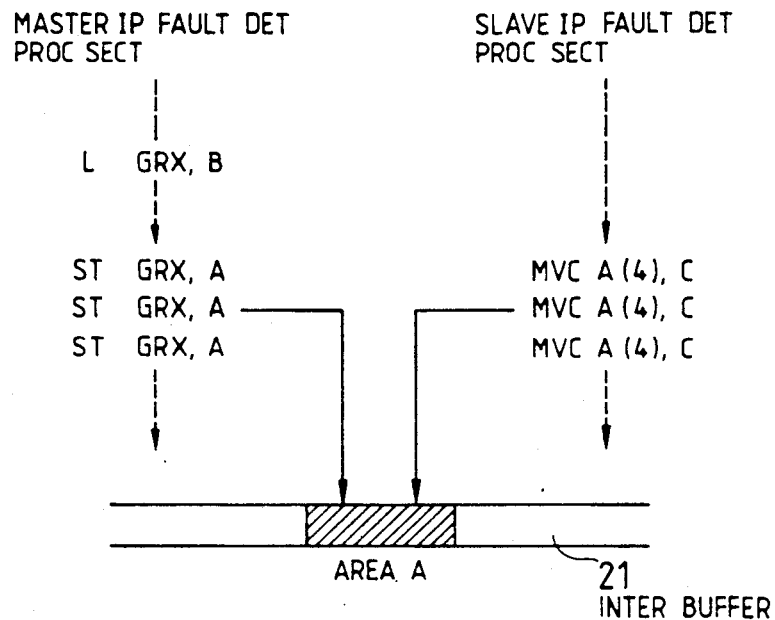
FIG. 4 shows instruction sequences to be executed by fault detecting process sections shown in FIG. 2.

FIG. 4 shows both the test instruction sequences to be executed by the fault detecting process sections 14 and 15, respectively, and the area of the intermediate buffer storage 21 to be rewritten by those instruction sequences. Of these, the instruction sequence to be executed by the fault detecting process section 14 of the master IP contains an instruction "L GRX, B" and a subsequent series of instructions "ST GRX, A", whereas the instruction sequence to be executed by the fault detecting process section 15 of the slave IP contains a series of instructions "MVC A(4), C". The instruction "L GRX, B" instructs to load the content of an area B into a general-purpose register X; the instruction "ST GRX, A" instructs to store the content of the general-purpose register X (i.e., the information loaded from the area B) into an area A; and the instruction "MVC A(4), C" instructs to move the content (4 byte long) of an area C to the area A. When the two instruction sequences are executed concurrently by the respective instruction processors, the store operations in the area A conflict. If, therefore, a pseudo-fault is generated in the area A in such a situation, the desired test conditions can be realized. The areas B and C are respectively preset with bit patterns which are equal to each other in at least a specified bit position, for considerations of a later-described pseudo-fault generating mechanism.

FIG. 3 is a flow chart showing the processing to be accomplished by the state control section 11. In the master IP 3a, the state control section 11 first initializes the operation circumstances of the master 3a and slave IP 3b (i.e., initializes an address translation table, a buffer storage, main storage areas, etc.) and also initializes the functional sections 12 to 18 (at Step 101). Next, the state control section 11 issues a start request to the slave IP 3b (at Step 102) and awaits an operation report (at Step 103). When the start proves successful, information specifying the position in the program and the physical position for generating a pseudo-fault are transferred to the fault injecting process section 19 in the service processor 6 (at Steps 104 and 105). The position in the program for generating the pseudo-fault is given as the starting address of the microprogram for the L instruction in the instruction sequence shown in FIG. 4 and the upper and lower limit main storage addresses indicating a suitable section (in which the executions of the MVC instruction sequence and the ST instruction sequence occur in parallel without fail irrespective of synchronization errors) of the MVC instruction sequence.

The physical position for generating the pseudo-fault is given as the location identifying information of the area A.

Figure 5:
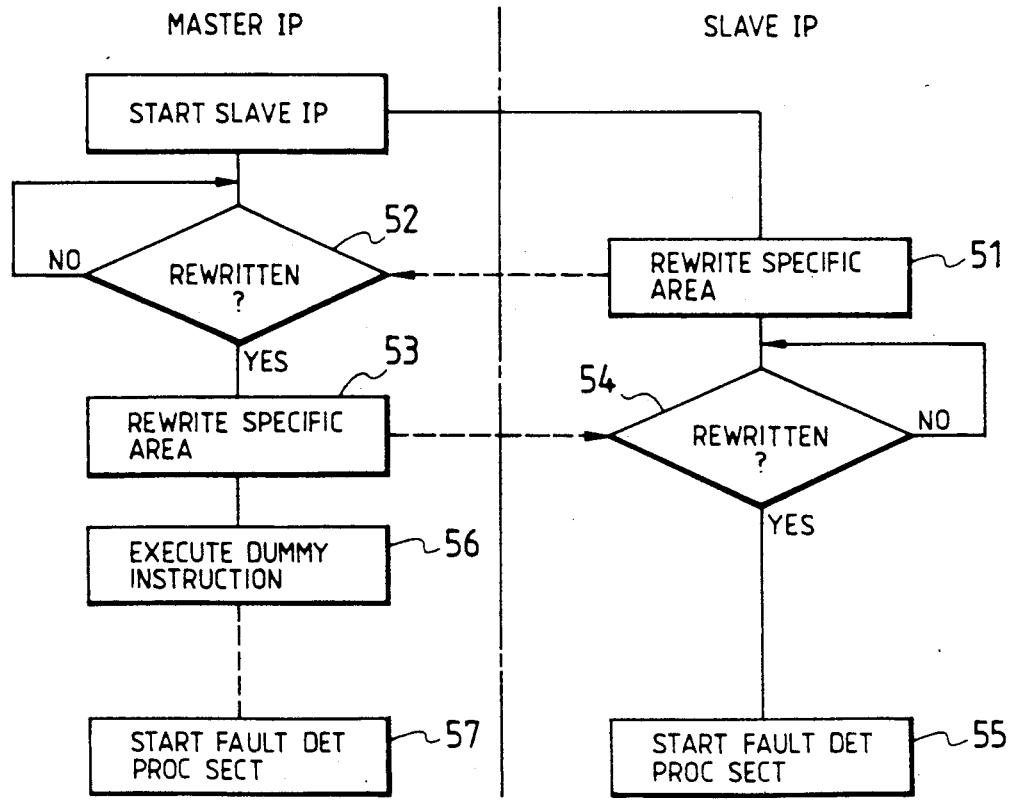
FIG. 5 is a flow chart showing the synchronization procedures by synchronizing process sections shown in FIG. 2.

Reverting to FIG. 3, a synchronizing processing (at Step 106) and resultant starts (at Step 107) of the fault detecting process sections 14 and 15 are then accomplished to ensure the simultaneous executions of the two instruction sequences shown in FIG. 4. The synchronizing processing is executed by the synchronizing process sections 12 and 13, as detailed in the form of the flow chart of FIG. 5. The slave IP 3b, after started, rewrites the content of a specific area of the main storage 1 (at Step 51). Meanwhile, the master IP 3a monitors the content of that specific area (at Step 52). When the rewrite is detected, the rewritten content is rewritten again (at Step 53). The slave IP 3b also monitors the content of that specific area (at Step 54) after the rewrite of the Step 51. When the second rewrite is detected, the slave IP 3b instantly starts its fault detecting process section 15 (at Step 55). On the other hand, the master IP 3a executes a suitable number of dummy instructions (e.g., no-operation instructions) 56 after the rewrite at the Step 53 and then starts its fault detecting process section 14. The number of those dummy instructions is so determined as to cover the time delay from the rewrite (at Step 53) by the master IP 3a to the start (at Step 55) of the fault detecting process section of the slave IP 3b. As a result of the synchronization process thus far described, the master IP 3a and slave UP 3b execute their respective instruction sequences shown in FIG. 4 in parallel.

Reverting again to FIG. 3, subsequent to the aforementioned synchronous starts of the fault detecting process sections 14 and 15, the state control section 11 issues a fault injection request to the service processor 6 (at Step 108). In the present embodiment, this request is given as the so-called "one-shot scan-in request". In response to this request, the service processor 6 accomplishes the fault injecting process shown in FIG. 6. In response to the one-shot scan-in request, more specifically, the fault injecting process section 19 thereafter monitors the CS (Control Storage) address of each micro instruction executed by the master IP 3a (at Step 61). When the CS address coincides with that given at the preceding Step 104 (i.e., the starting address of the microprogram for the L instruction shown in FIG. 4), the fault injecting process section 19 then monitors the main storage address of each instruction executed by the slave IP 3b (at Step 62). If the address of the instruction to be executed falls between the upper and lower limit addresses given at Step 104, it can be concluded that an operation conflict is in progress. A pseudo-fault is then generated (at Step 63) in the area A whose location was specified at the Step 105. The generation of the pseudo-fault is effected by inverting each bit value of the content of the specified area A, and the detection of the pseudo-fault is accomplished by examining whether the value of the specified bit of the content of the area A coincides with that of the data previously written therein. For this reason, as has been described with reference to FIG. 4, the contents of the areas B and C have to be identical to each other in at least the position of the aforementioned specified bit.

When a fault is thus detected, the control is transferred to the fault information collection section 16 of the master IP so that the fault information is collected (at Step 109). The fault information thus collected is compared (at Step 110) with the proper fault information prepared in advance. If a coincidence takes place, the fault handling functions may be normal. If not, however, the fault handling functions must be abnormal so that the fault information collected is edited and outputted for analysis (at Step 111). In either event, one stage of the test is ended, and the slave IP 3b is stopped (at Step 112).

In a modified embodiment, the position in the program for generating the pseudo-fault may be defined by a position in the instruction sequence to be executed by the master IP instead of a position in the instruction sequence to be executed by the slave IP. Also, depending upon the architecture of the instruction processor, the main storage address of the instruction can be used in plate of the CS address for determining the injection timing of the pseudo-fault. Moreover, the kind of the operation to be caused by the test instruction sequences may vary according to the characteristic of the shared unit.

What is claimed is:

1. A method for testing the fault handling function of a multi-processor system including a first processor, a second processor and a shared unit shared by said first and second processors, comprising the steps of:
   synchronizing issuance of an operation request from said first processor to said shared unit with issuance of an operation request from said second processor to said shared unit such that said operation requests are issued without an interval therebetween sufficient for said shared unit to respond;
   generating a pseudo-fault during synchronized issuance of said operation requests; and
   collecting fault information resulting from said pseudo-fault.

2. A method as claimed in claim 1, wherein said synchronizing step includes the step of:
   synchronizing initiation of execution by said first processor of a first sequence of instructions each requiring an operation of said shared unit with initiation of execution by said second processor of a second sequence of instructions each requiring an operation of said shared unit.

3. A method as claimed in claim 2, wherein said generating a pseudo-fault step includes the step of:
   generating said pseudo-fault when an arbitrary one of instructions contained in a predetermined section of said first instruction sequence is executed.

4. A method for testing the fault handling function of a multi-processor including a first processor, a second processor and a storage control unit shared by said first and second processors, comprising the steps of:
   synchronizing issuance of an access request for a storage area from said first processor to said storage control unit with issuance of an access request for said storage area from said second processor to said storage control unit such that said access requests are issued without an interval therebetween sufficient for said storage control unit to respond;
   generating a pseudo-fault in said storage area during synchronized issuance of said access requests; and
   collecting fault information resulting from said pseudo-fault.

5. A method as claimed in claim 4, wherein said synchronizing step includes the step of:
   synchronizing initiation of execution by said first processor of a first sequence of instructions all requiring accesses to the same storage area with initiation of execution by said second processor of a second sequence of instructions all requiring accesses to the same storage area.

6. A method as claimed in claim 5, wherein said generating a pseudo-fault step includes the step of:
   generating said pseudo-fault when an arbitrary one of instructions contained in a predetermined section of said first instruction sequence is executed.

7. A method for testing the fault handling function of a multi-processor system including a first processor, a second processor, a storage control unit shared by said first and second processors, and a service processor, comprising the steps of:

transferring from said first processor to said service processor information specifying a position in a program and a storage area in which a pseudo-fault is to be generated;

synchronizing initiation of execution by said first processor for a first sequence of instructions all requiring accesses via said storage control unit to said specified storage area with initiation of execution by said second processor of a second sequence of instructions all requiring accesses via said storage control unit to said specified storage area such that a plurality of accesses are required without an interval therebetween sufficient for said storage control unit to respond;

generating said pseudo-fault with said service processor in said specified storage area when the instruction in said specified position in said program is executed; and collecting fault information resulting from said pseudo-fault.

* * * * *